United States Patent [19]

Shimomura

[11] Patent Number: 4,721,034

[45] Date of Patent: Jan. 26, 1988

[54] COFFEE MAKER OR LIKE BEVERAGE MAKING DEVICE

[75] Inventor: Nobuo Shimomura, Nagoya, Japan

[73] Assignee: Kabushiki Kaisha Toshiba, Kawasaki, Japan

[21] Appl. No.: 942,342

[22] Filed: Dec. 16, 1986

[30] Foreign Application Priority Data

Jan. 31, 1986 [JP] Japan .................. 61-020907
Feb. 5, 1986 [JP] Japan .................. 61-023521

[51] Int. Cl.⁴ .......................................... A47J 31/047
[52] U.S. Cl. .......................................... 99/280; 99/292; 99/299
[58] Field of Search .............. 99/279, 280, 281, 282, 99/283, 285, 286, 292, 293, 296, 299, 300, 302 R, 316; 426/433

[56] References Cited

U.S. PATENT DOCUMENTS 2,577,985 12/1951 Willman .................. 99/292
2,756,667 7/1956 Burns .................. 99/292
3,130,663 4/1964 Wickenberg .................. 99/292

*Primary Examiner*—Robert W. Jenkins
*Attorney, Agent, or Firm*—Schwartz, Jeffery, Schwaab, Mack, Blumenthal & Evans

[57] ABSTRACT

A siphon coffee maker consists of a lower container into which water is poured and which is heated with an electric heater, an upper container for containing coffee powder, the upper container communicating with the lower container so that hot water is transferred between the containers through a water feed tube due to siphon effects, and a pressure reducing valve which communicates the lower container with the atmosphere. The pressure reducing valve is opened for approximately 60 seconds for a soak-like processing when the temperature of the water reaches approximately 100° C. Alternately, a pressure reducing valve is kept opened from the time when the temperature of the lower container reaches approximately 105° C. to the time when the ingredients extracting operation is completed.

7 Claims, 13 Drawing Figures

COFFEE MAKER OR LIKE BEVERAGE MAKING DEVICE

BACKGROUND OF THE INVENTION

1. Field of the Invention

This invention generally relates to a siphon coffee maker or like beverage making device in which hot water in a lower container is fed to an upper container provided with a material such as coffee powder therein by making use of difference in aerial pressure in the containers and further in which the hot water is returned to the lower container to thereby extract ingredients from the material.

2. Description of the Prior Art

Siphon coffee makers of the prior art type generally comprise a lower container into which a predetermined amount of water is poured and which is heated with an alcohol lamp, an upper container provided therein with coffee powder which amount corresponds with that of the water provided in the upper container and having a water feed tube downwardly extending from the bottom thereof through a filter to be inserted into the lower container. In operation, the water in the lower container is transferred through the tube into the upper container due to increase of pressure in the lower container when heated and boiled with the alcohol lamp. Thus, the hot water is mixed with the coffee powder in the upper container. When the fire of the alcohol lamp is turned out, the aerial pressure in the lower container is decreased. The hot water mixed with coffee powder is transferred through the filter to the lower container so that coffee is gained.

It has been generally known that more flavorous coffee is gained where coffee powder to which small amount of hot water is poured is left wet for a short period of time before pouring an amount of hot water necessary for extraction. This operation is hereinafter referred to as "soak-like processing."

According to the above-described siphon coffee maker, however, when the water in the lower container is heated and boiled, all the hot water is successively fed to the upper container. Accordingly, the soak-like processing cannot be performed. Thus, the prior art siphon coffee maker has a problem to be solved in the point of flavor of coffee.

Additionally, in the prior art siphon coffee makers, the fire of the alcohol lamp or the like needs to be manually turned out so that the hot water mixed with coffee powder in the upper container is fed through the filter to the lower container. Thus, an operator is forced into troublesome manual operation. Further, the operator needs to be by the side of the coffee maker while the water in the lower container is heated. Further, the fire of the alcohol lamp needs to be timely turned out after coffee is collected in the lower container. The operation timing, however, differs from time to time and the flavor of coffee also differs from time to time.

SUMMARY OF THE INVENTION

It is therefore a primary object of the present invention to provide an improved siphon coffee maker or like beverage making device in which the soak-like processing for the material such as coffee powder is automatically performed before ingredients extracting operation so that flavorous coffee or other beverages are gained.

It is a second object of the present invention to provide an improved siphon coffee maker or like beverage making device in which the extracting operation is automatically performed timely without delay or prematurity after the hot water is mixed with the material with siphon effects.

The coffee maker in accordance with this invention comprises a lower container into which water is poured and heated by a heater, an upper container in which a material such as coffee powder is provided and further which is adapted to cooperate with the lower container so that hot water is inter-transferred between the containers due to siphon effects, and a pressure reducing valve which is provided in the lower container to reduce internal pressure of the lower container when the valve is opened.

In a first aspect of the present invention, the pressure reducing valve is controlled so as to be opened for a predetermined period of time immediately after a predetermined small amount of hot water is fed from the lower container to the upper container. The feeding of hot water to the upper container is interrupted while the pressure reducing valve is opened, so that the soak-like processing is performed in the upper container. Afterwards when the pressure reducing valve is closed, the pressure in the lower container is again increased due to the heating with the heater. Thus, the extracting operation is automatically started.

As the result of the soak-like processing, the material such as coffee powder in the upper container is changed in quality so that ingredient thereof is readily soluble in hot water. Accordingly, in the extracting operation, flavorous coffee containing much ingredient is gained. In the first aspect of this invention, the opening operation of the pressure reducing valve is started by a temperature sensitive switch sensing the temperature of water in the lower container. Additionally, it is preferable that the period of time for which the pressure reducing valve is opened is controlled with a timing circuit.

In a second aspect of this invention, the pressure reducing valve is controlled so as to be automatically opened when approximately all hot water in the lower container is fed to the upper container by siphon effects. The pressure in the lower container is reduced when the valve is opened, so that the hot water mixed with the material in the upper container is fed to the lower container so that the extracting operation is automatically started. Accordingly, manual operation is effectively eliminated when the extracting operation is started, and the extracting operation is timely started, so that coffee or other beverages of uniform quality are gained. In the second aspect of this invention, it is preferable that a temperature sensitive means is provided for sensing sudden increase of the temperature of the lower container, for example, increase of the temperature to 105° C. after all the hot water is fed to the upper container and that the pressure reducing valve is opened when sudden increase of the temperature of the lower container is sensed by the temperature sensitive means.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF PREFERRED EMBODIMENTS

Figure 1:
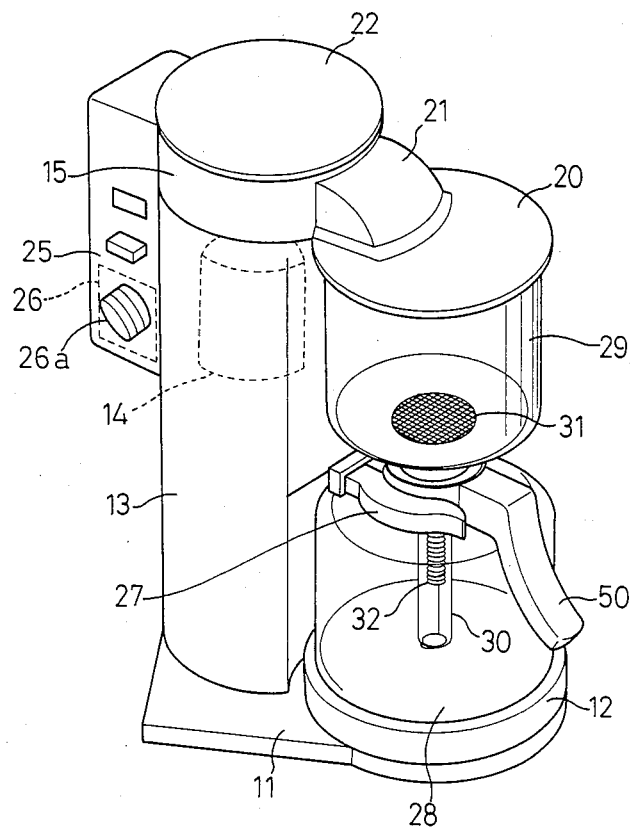
FIG. 1 is a perspective view of the coffee maker in accordance with a first embodiment of this invention.

Referring now to FIGS. 1-6, the coffee maker of the first embodiment will be described. Referring first to FIG. 1, a hot plate 12 and a mechanism case 13 are provided on a base 11. An electric motor 14 is provided in the mechanism case 13. A coupling axis 14b is mounted on an upper end of a rotation axis 14a and extended upwardly through the bottom portion of an engaging concave portion 13a formed at the upper end of the case 13. A grind case 15 is placed on the case 13 and a plurality of generally inverted L-shaped engage grooves 17 are formed in the lower part of the grind case 15. Projections 16 formed on the inner periphery of the concave portion 13a of the case 13 detachably engage the inverted L-shaped grooves 17 in a manner of a bayonet. A cutter 18 is provided in the grind case 15 and a rotation axis thereof is adapted to engage the coupling axis 14b of the motor 14 so that rotation of motor 14 is transmitted to the cutter 18 when the grind case 15 is engaged with the mechanism case 13. An opening 15a is formed in part of the peripheral wall of the grind case 15 and covered with a filter 19. A guide 21 for guiding coffee powder from the grind case 15 to an upper container 29 is formed integrally with the grind case 15 so as to cover the opening 15a at one end. A lid 20 of the upper container 29 is also formed integrally with the guide 21 at the other end thereof. A lid 22 of the grind case 15 has two projections 23 formed in outer periphery thereof. Since the projections 23 engage concave portions 24 respectively formed in upper inner periphery of the grind case 15, the lid 22 is detachably mounted on upper opening of the grind case 15 so that the lid 22 cannot be moved easily. As shown in FIG. 1, an operation box 25 is provided at the upper side of the case 13 and a course control timer 28 is provided in the operation box 25. The course control timer 26 is of a well known flat spiral spring type and operated with a knob 26a. A horseshoe-shaped holder 27 is supported by a supporter 27a at the central portion of the case 13 so as to be positioned over the hot plate 12.

Figure 2:
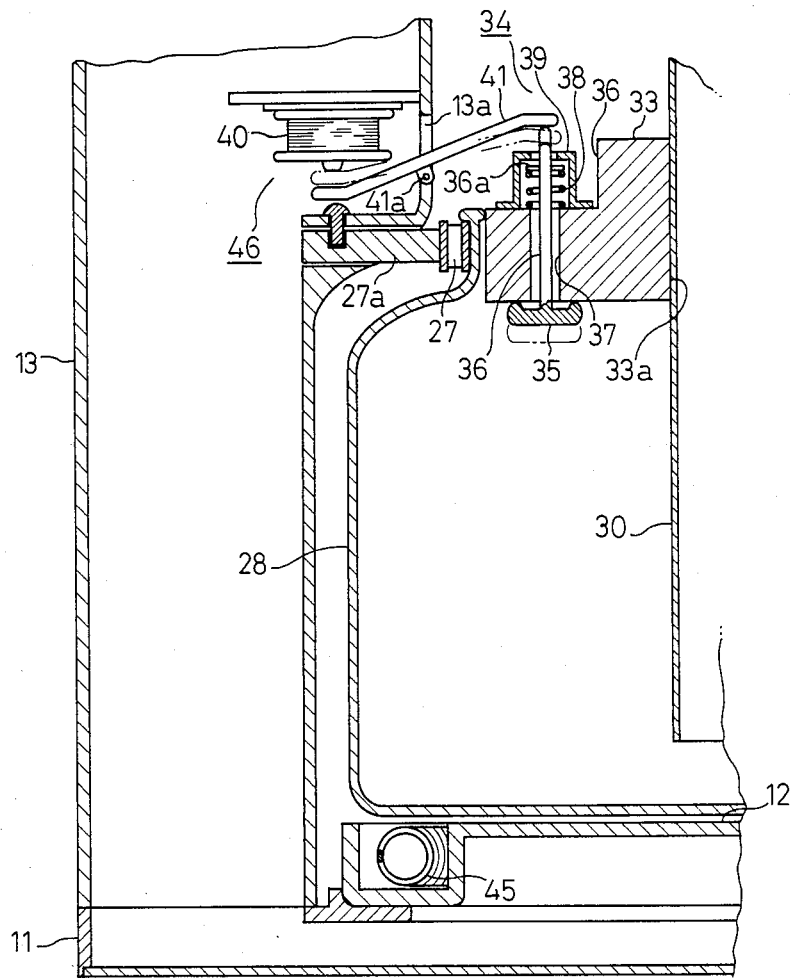
FIG. 2 is an enlarged partial longitudinal section of the coffee maker in FIG. 1.
Figure 3:
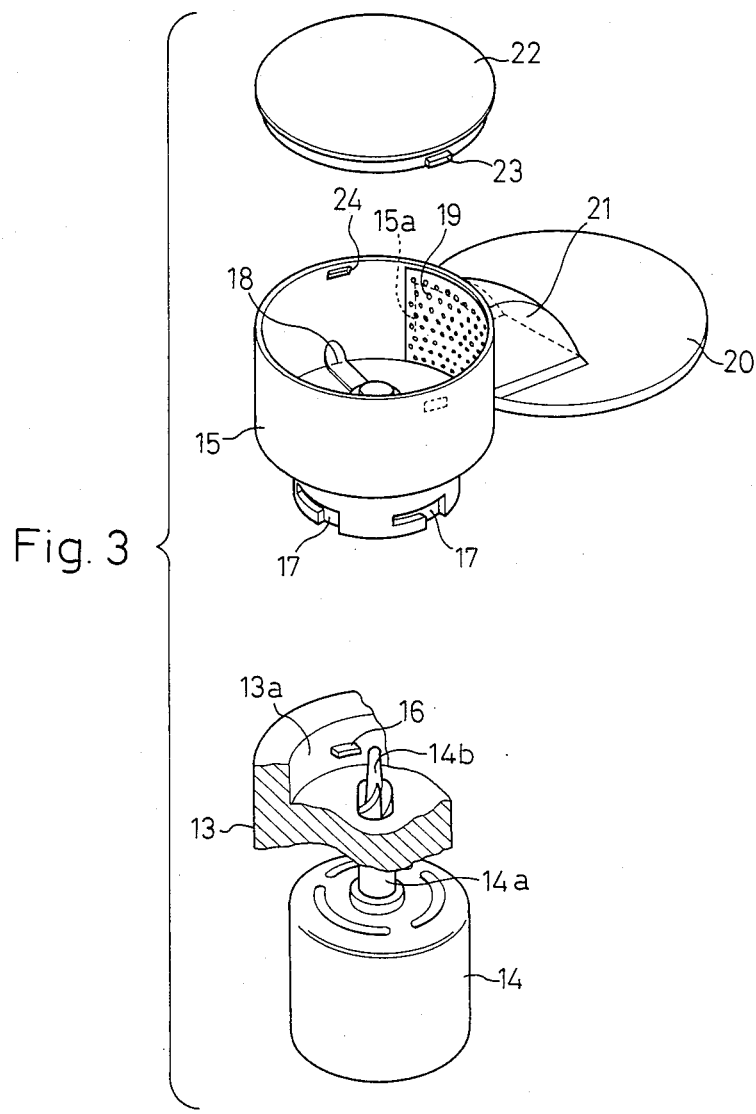
FIG. 3 is an exploded perspective view of a grinding mechanism of the coffee maker in FIG. 1.
Figure 4:
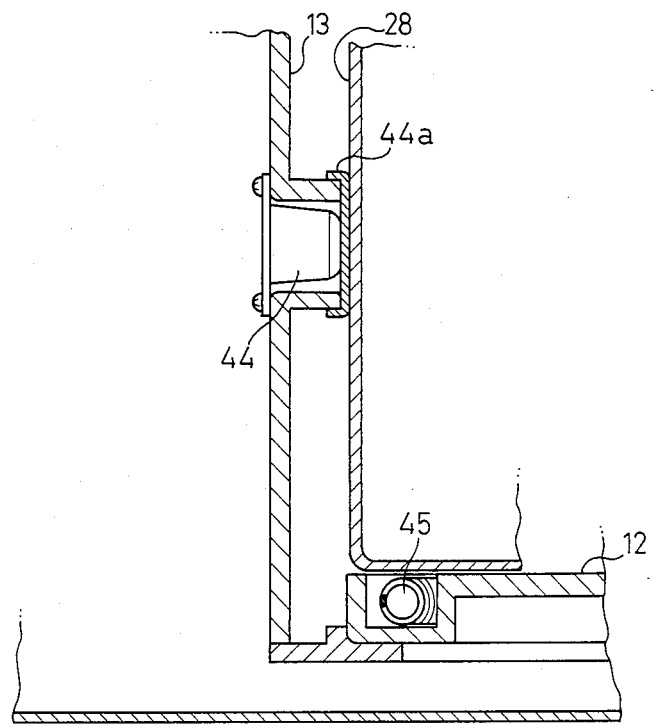
FIG. 4 is an enlarged longitudinal section of a portion of the coffee maker in FIG. 1, at which portion a temperature sensitive switch is provided.

A lower container 28 is formed of a material such as heat-proof glass, and the upper portion thereof is gripped by the holder 27 so that the container 28 is held on the hot plate 12. The upper container 29 is also formed of heat-proof glass. A water feed tube 50 is extended downwardly from the central bottom portion of the upper container 29 and has a filter 31 provided on an upper opening thereof. The filter 31 is supported by a spring 32 one end of which is attached to the lower end of the tube 30. An annular rubber gasket 33 shown in FIG. 2 is provided on the upper opening of the lower container 28. The tube 30 is extended through an aperture 33a formed in the center of the gasket 33, so that the upper container 29 is supported by the lower container 28, which is air-tightly closed.

A pressure reducing valve 34 shown in FIG. 1 generally has the construction that a working rod 36 having a valve medium 35 of disc-shaped type on a lower end thereof is extended upwardly through a vent 37 formed in the gasket 33. Downward movement of the working rod 36 causes the valve medium 35 to move away from the peripheral edge of the lower opening of the vent 37 to thereby open the vent 37, whereby the lower container 28 communicates with the atmosphere.

A pin 36a is provided on the upper end of the working rod 36 and a compression spring 38 is provided between the pin 36a and the upper side of the gasket 33. Accordingly, the working rod 36 is urged upwardly by the compression spring 38 to usually keep the pressure reducing valve 34 closed. The compression spring 38 is covered with a protecting cover 39 provided on the upper side of the gasket 33, and the working rod 36 is extended through the upper wall of the protecting cover 39.

Figure 5:
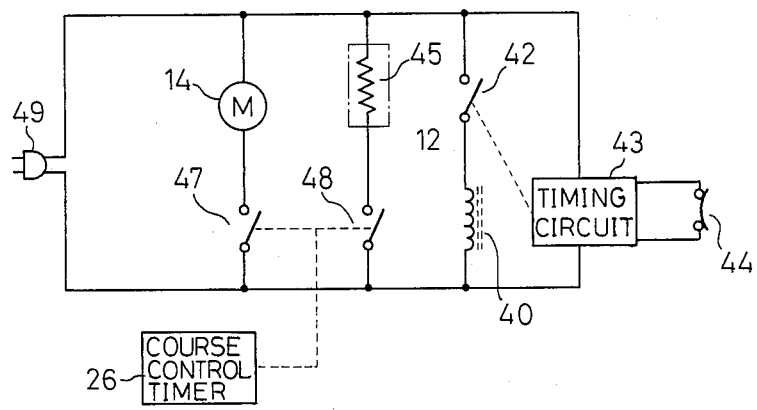
FIG. 5 is a control circuit diagram employed in the coffee maker of the first embodiment.
Figure 6A:
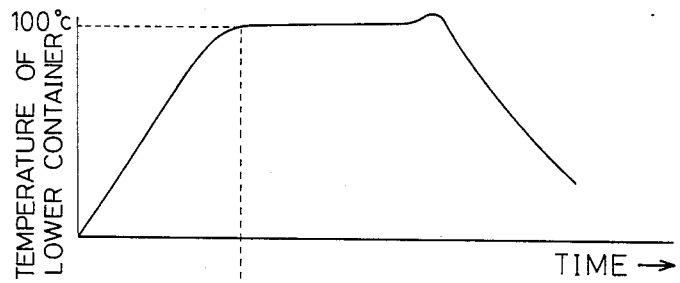
FIG. 6A is a graph showing changes of the temperature of the lower container of the coffee maker in FIG. 1.
Figure 6B:
FIGS. 6B through 6E are a set of timing charts for explaining the operation controlled by the circuit in FIG. 5.
Figure 6C:
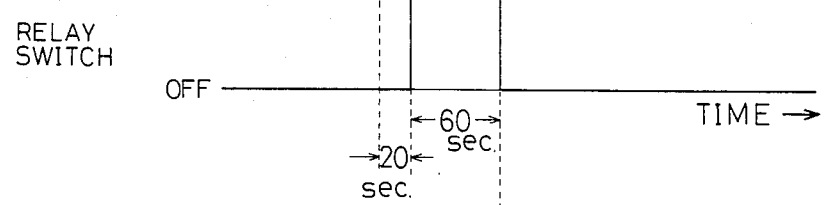
Figure 6D:
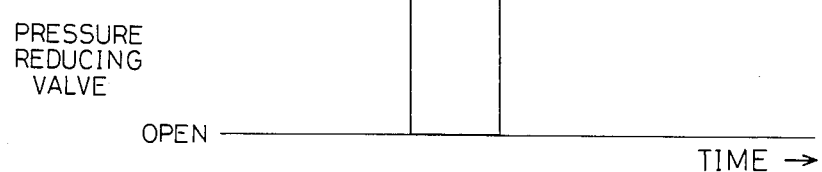
Figure 6E:
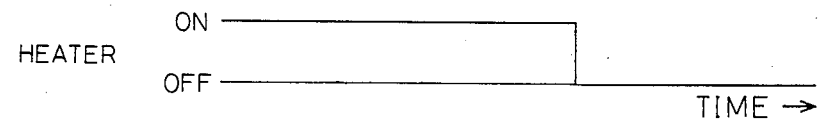

An electromagnet 40 is provided in the mechanism case 13 so as to be positioned in opposed relation to the pressure reducing valve 34. A working lever 41 is extended through an aperture 13a formed in the mechanism case 13 between the electromagnet 40 and the valve 34 and mounted on an axis 41a for rotative movement thereabout. When the electromagnet 40 is energized, one end of the working lever 41 is attracted as shown in chain line in FIG. 2 and the other end of the lever 41 depresses the working rod 36. Consequently, the valve medium 35 is moved away from the vent 37 so that the vent 37 is opened. Additionally, as shown in FIG. 5, the electromagnet 40 is designed to be energized when a first timer switch 42 as output contacts of a valve control timing circuit 43 provided in the mechanism case 13 is closed. The timing circuit 43 starts its timing operation when a temperature sensitive switch 44 is turned off, whereby the first timer switch 42 is turned on twenty seconds after the start of the timing operation. The first timer switch 42 is held at the on-state for sixty seconds and turned off after lapse of sixty seconds.

The temperature sensitive switch 44 is provided in the mechanism case 13 so as to be in contact with the side wall of the lower container 28 on the hot plate 12 through a thermally conductive cap 44a. The temperature sensitive switch 44 is set so as to turn off when the temperature of water in the lower container 28 reaches the boiling point. Thus, the electromagnet 40, the working lever 41, the first timer switch 42, the timing circuit 43 and the temperature sensitive switch 44 constitute a valve control unit 46 which opens the valve 34 momentarily after a small amount of hot water is fed to the upper container 29 and further which closes the valve 34 afterwards.

A heater 45 provided in the hot plate 12 and the motor 14 in the mechanism case 13 are connected to a power-supply terminal 49 through second and third timer switchee 47 and 48 reepectively. On-off operation of the switches 47 and 48 is controlled by the course control timer 26. Hence, when the timing is set by turning the knob 26a in a direction, the timer 26 operates to close the second timer switch 47 for a period of time set with the knob 26a and to open the second timer switch 47 after lapse of time period set with the knob 26a with the simultaneous closing of the third timer switch 48. The third timer switch 48 can be reopened by manually turning the knob 26a in the other direction.

In operation, the lid 22 of the grind case 15 is removed. A certain amount of coffee beans is put into the grind case 15 and the lid 22 is attached again. The lower container 28 is removed out from the holder 27 together with the upper container 29, which is then removed from the lower container 28. A necessary amount of water is poured into the lower container 28, and then the upper container 29 is recombined with the lower container 28. The containers are placed on the hot plate 12 with the holder 27 gripping the upper end of the lower container 28. A period of time necessary for grinding the coffee beans is set by turning the knob 26a of the course control timer 26. Since the second timer switch 47 is closed first, the motor 14 is energized, thereby rotating the cutter 18 in the grind case 15. The coffee beans in the grind case 15 are ground into coffee powder, which is led through the filter 19 into the upper container 29 by the guide 21. When the period of time set with the knob 26a elapses, the second timer switch 47 is opened to thereby deenergize the motor 14 and stop the rotation of the cutter 18. Simultaneously, since the third timer switch 48 shown in FIG. 5 is closed, the heater 45 is energized to apply heat to the water in the lower container 28. When the water is boiled, internal pressure of the lower container 28 is rapidly increased. See FIG. 6A. The hot water is then started to be fed through the tube 30 and the filter 31 and soaks the coffee powder in the upper container 29. The temperature sensitive switch 44 in contact with the lower container 28 is turned off when the temperature of the hot water in the lower container 28 approximates 100° C., so that the valve control timer circuit 43 is activated. See FIG. 6B. When twenty seconds elapses from the time when the temperature sensitive switch 44 is turned off, that is, when the hot water starts to soak the coffee powder in the upper container 29, the first timer switch 42 is closed. See FIG. 6C. Accordingly, the electromagnet 40 is energized and the working lever 41 depresses the working rod 36 of the valve 34. Consequently, the valve 34 is opened and the lower container 28 is communicated to the atmosphere through the vent 37, so that the internal pressure of the container 28 is rapidly reduced. Simultaneously, the hot water ceases to rise up to the upper container 29. The feed of hot water to the upper container 29 is interrupted for sixty seconds, while the coffee powder is put into the soak-like processing for sixty seconds. Thus, the soak-like processing is performed in the upper container 29 for sixty seconds. When sixty seconds elapses from the time when the valve 34 is opened, the timing circuit 43 causes the first timer switch 42 to open to thereby deenergize the electromagnet 40. Accordingly, the pressure reducing valve 34 is subjected to a spring force of the compression spring 38 and reclosed. Since the heater 45 is kept energized, the hot water in the lower container 28 is remained boiled, and the internal pressure of the container 28 is rapidly increased when the valve 34 is reclosed. The hot water is successively fed to the upper container 29. The hot water is mixed with the presoaked coffee powder to thereby perform the ingredients extracting operation. The third timer switch 48 is then opened by turning the knob 26a to off-position, so that the heater 45 is deenergized. Accordingly, the internal pressure of the lower container 28 is gradually reduced, and the hot water mixed with coffee powder is transferred through the filter 31 and the tube 30 to the lower container 28. Thus, coffee is gained. The containers 28 and 29 are removed from the coffee maker with a grip 50 gripped by an operator and the upper container 29 is detached from the lower container 28. Coffee is then poured into a cup or cups (not shown).

According to the coffee maker of the first embodiment of this invention, it will be appreciated that the pressure reducing valve 34 is opened twenty seconds after the boiled or almost boiled water is caused to rise up through the tube 30 into the container 29 and that the valve 34 is reclosed after keeping opened for sixty seconds. As described above, the feeding of hot water to the container 29 is momentarily interrupted after a small amount of hot water is supplied for twenty seconds. The hot water is resupplied to the container 29 after the interruption lasts for sixty seconds. Hence, the small amount of hot water permeates particles of the coffee powder sufficiently while the feeding of hot water to the container 29 is being interrupted. Consequently, flavorous coffee is extracted.

In order to momentarily interrupt the feeding of hot water from the container 28 to the container 29, the heater 45 could be momentarily deenergized after the water in the container 28 is boiled up, in a manner different from that employed in this invention. However, the problem arises that the interruption of the feeding and the refeeding of hot water cannot promptly be controlled due to the influence of heat remaining in the heater 45. In accordance with the present invention, the feeding of hot water is momentarily interrupted by opening the pressure reducing valve 34 provided in the container 28, so that the amount of hot water supplied for the soak-like Processing and the period of time necessary for the soak-like processing can precisely be controlled. This construction facilitates extraction of coffee with good flavor and uniform quality.

Although the opening operation of the valve 34 started twenty seconds after the beginning of rise of hot water to the upper container 29 is continued for the period of sixty seconds, the time lengths may be changed. For example, the timer 26 may be constructed so that two kinds of time lengths are automatically selected with on-off operation of a switch in accordance with an amount of coffee to be made, and hence an amount of coffee beans.

In order to feed the hot water mixed with coffee powder from the container 29 to the container 28 to make coffee more quickly, the electromagnet 40 may momentarily be energized to thereby open the valve 34 simultaneously when the third timer switch 48 is opened.

Figure 7:
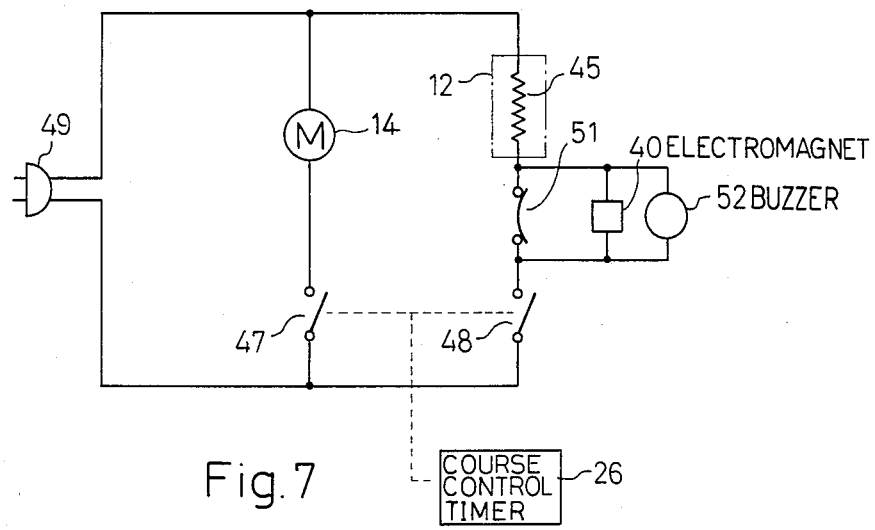
FIG. 7 is a control circuit diagram employed in the coffee maker of a second embodiment.

A second embodiment of the coffee maker in accordance with the present invention will now be described. Overall construction of the device is the same as that of the first embodiment shown in FIGS. 1-4, but the second embodiment employs a different circuit arrangement as shown in FIG. 7. As shown in FIG. 7, the motor 14 is supplied with electric power from the terminal 49 through the second timer switch 47 of the course control timer 26. The heater 45 of the hot plate 12 is supplied with electric power from the terminal 49 through the third timer switch 48 and a temperature sensitive switch 51 connected in series thereto respectively. The electromagnet 40 of the valve control unit 46 and a buzzer 52 are connected in parallel to the temperature sensitive switch 51. The temperature sensitive switch 51 is provided in the mechanism case 13 in the same manner as in the case of the temperature sensitive switch 44 and adapted to be turned off when the temperature of the lower container 28 increases to the temperature approximately 5° C. higher than the boiling temperature (100° C.).

In the operation of the coffee maker of the second embodiment, when the course control timer 26 is set by turning the knob 26a, the second timer switch 47 is turned on for a predetermined period of time as in the first embodiment. The motor 14 is energized, so that the coffee beans in the grind case 15 are ground into coffee powder, which is transferred into the upper container 29 through the guide 21. Afterwards, the second iimer switch 47 is turned off due to the timing operation of the timer 26 and the third timer switch 48 is turned on, so that the heater 45 of the hot plate 12 is energized through the temperature sensitive switch 51 and starts to apply heat to the water in the container 28. When the water is boiled up, the hot water is fed to the upper container 29 through the water feed tube 3o. When all the hot water is fed, the temperature of the lower container 28 rapidly increases. The temperature sensitive switch 51 is turned off when the temperature of the container 28 increases to approximately 105° C. When the temperature sensitive switch 51 is turned off, the elecromagnet 40 and the buzzer 52 are simultaneously energized, so that the working lever 41 is subjected to the attraction force of the electromagnet 40 and moved. The valve medium 35 is moved so that the vent 37 is opened, and the internal pressure of the lower container 28 is reduced. The hot water mixed with coffee powder is transferred through the water feed tube 30 and the filter 31, so that coffee is extracted in the lower container 28. In this case, the buzzer 52 informs the operator that the the extracting operation will shortly be completed.

The coffee maker of the second embodiment is characterized in that the extracting operation is automatically performed by a pressure reducing unit including the pressure reducing valve 34 and the temperature sensitive switch 51 which are adapted to operate when all the hot water in the container 28 is fed to the container 29. Consequently, since the period of time from the feeding of hot water to the collecting of coffee in the lower container 28 is not affected or changed by the ambient temperature or the speed at which the hot plate 12 is cooled, coffee having a uniform flavor and quality can always be served. Additionally, the process of feeding the hot water mixed with coffee powder to the lower container 28 is automatically performed without requiring any manual operation, so that the present invention can provide a quite useful coffee maker.

Figure 8:
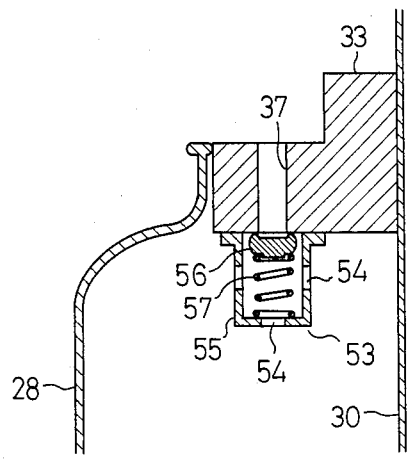
FIGS. 8 and 9 are respectively enlarged partial longitudinal section of the pressure reducing valve employed in the modification of the second embodiment.

FIG. 8 illustrates a pressure reducing valve 53 of a modification of the second embodiment. Identical parts are labelled by the same numerals as in the first embodiment. A valve case 55 having a plurality of openings 54 formed in the peripheral wall thereof is mounted on the underside of the gasket 33 so as to cover the vent 37. A valve medium 56 opening and closing the vent 37 and a spring 57 usually urging the valve medium 56 in the direction of closing the vent 37 are provided in the valve case 55. The spring 57 is formed of a shape memory alloy which reversibly deforms when heated above a predetermined temperature.

Figure 9:
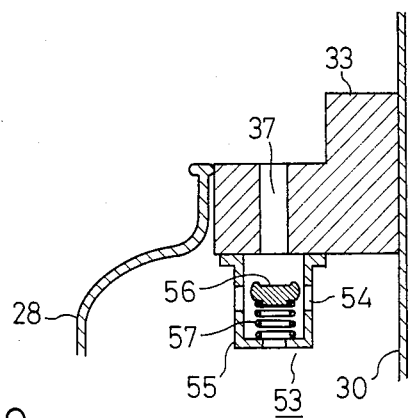

In the modification, the spring 57 also serves as a means for opening and closing the valve 53. When the temperature of the lower container 28 approximates 105° C., the spring 57 contracts in the direction of moving the valve medium 56 away from the vent 37 as shown in FIG. 9. When the temperature of the lower container 28 is decreased below 105° C., the spring 57 expands so as to apply a spring force to the valve medium 56 to push it against the peripheral surface of the vent 37 as shown in FIG. 8. In the case where the pressure reducing valve 53 is constructed as described above, the temperature sensitive switch 51, the electromagnet 40 and the buzzer 52 are eliminated and the heater 45 is connected in series to the third timer switch 48 in the circuit shown in FIG. 7.

Although the present invention is applied to a siphon coffee maker in the foregoing description, the invention may be applied, for example, to a device for making tea. In the present invention, a mechanism for grinding a material such as coffee beans may be eliminated. Also, advantages of this invention will be obtained even where the electric heater is replaced by an alcohol lamp.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A coffee maker or like beverage making device comprising:
    (a) a lower container for containing water;
    (b) a heater for applying heat to said lower container;
    (c) an upper container for containing a material such as coffee powder, said upper container having a water feed tube, said water feed tube having a portion thereof insert into said lower container;
    (d) a filter provided in said upper container for preventing transfer of the material into said lower container and allowing a beverage such as coffee to be made to transfer into said lower container through said water feed tube;
    (e) a pressure reducing valve communicating said lower container with the atmosphere when opened; and
    (f) a means for opening said pressure reducing valve for a predetermined period of time corresponding to a soak-like processing period of time after a predetermined short period of time from the time when hot water in said lower container starts to transfer to said upper container through said water feed tube and further closing said pressure reducing valve when the predetermined period of time elapses.

2. A coffee maker or like beverage making device as set forth in claim 1, wherein said valve opening and closing means comprises a temperature sensitive switch which is responsive when the temperature of the water in said lower container increases to approximately the boiling point and a timing means for controlling the timing of opening and closing of said pressure reducing valve when receiving a signal from said temperature sensitive switch.

3. A coffee maker or like beverage making device as set forth in claim 2, wherein said valve opening and closing means comprises an electromagnet for operating said pressure reducing valve, said electromagnet being controlled by said timing means so as to be energized and deenergized.

4. A coffee maker or like beverage making device comprising:
  (a) a lower container for containing water;
  (b) a heater for applying heat to said lower container;
  (c) an upper container for containing a material such as coffee powder, said upper container having a water feed tube, said water feed tube having a portion thereof insert into said lower container;
  (d) a filter provided in said upper container for preventing transfer of the material into said lower container and allowing a beverage such as coffee to be made to transfer into said lower container through said water feed tube;
  (e) a pressure reducing valve communicating said lower container with the atmosphere when opened; and
  (f) a means for opening and closing said pressure reducing valve at the time when the feeding of hot water from said lower container to said upper container is completed.

5. A coffee maker or like beverage making device as set forth in claim 4, wherein said valve opening and closing means comprises a temperature sensitive switch which is operative at the time when the temperature of the lower container increases above the boiling point of water and an electromagnet which receives a signal from said temperature sensitive switch to thereby operate so that the pressure reducing valve is opened.

6. A coffee maker or like beverage making deivce as set forth in claim 4, wherein said valve opening and closing means comprises a member formed of a shape memory alloy, which member changes its shape when the temperature of the lower container increases above the boiling point of water, which shape changing movement being transmitted to a valve medium of said pressure reducing valve.

7. A coffee maker or like beverage making device as set forth in claim 6, wherein said member formed of the shape memory alloy is formed into a spring to apply a resilient force to said valve medium so that said valve medium is closed at the room temperature.

* * * * *